(12) United States Patent
Kataoka et al.

(10) Patent No.: US 8,788,914 B2
(45) Date of Patent: Jul. 22, 2014

(54) TRANSMISSION SYSTEM

(75) Inventors: Hiroaki Kataoka, Tokyo (JP); Shinya Kamada, Tokyo (JP)

(73) Assignee: NEC Corporation, Tokyo (JP)

( * ) Notice: Subject to any disclaimer, the term of this patent is extended or adjusted under 35 U.S.C. 154(b) by 130 days.

(21) Appl. No.: 13/639,675

(22) PCT Filed: Mar. 7, 2011

(86) PCT No.: PCT/JP2011/001317
§ 371 (c)(1),
(2), (4) Date: Oct. 5, 2012

(87) PCT Pub. No.: WO2011/125285
PCT Pub. Date: Oct. 13, 2011

(65) Prior Publication Data
US 2013/0024750 A1  Jan. 24, 2013

(30) Foreign Application Priority Data

Apr. 9, 2010 (JP) ................................. 2010-090257

(51) Int. Cl.
*H03M 13/00* (2006.01)
(52) U.S. Cl.
USPC ........... 714/776; 370/218; 370/222; 370/225; 370/227; 709/239
(58) Field of Classification Search
USPC ................ 714/776; 370/218–227; 709/239
See application file for complete search history.

(56) References Cited

U.S. PATENT DOCUMENTS

| 5,809,011 A | 9/1998 | Almay |
| 2003/0002116 A1 | 1/2003 | Hayashi et al. |

FOREIGN PATENT DOCUMENTS

| JP | 04-176230 | 6/1992 |
| JP | 06-164557 | 6/1994 |
| JP | 07-023032 | 1/1995 |
| JP | 08-032592 | 2/1996 |
| JP | 09-507735 | 8/1997 |
| JP | 10-145374 | 5/1998 |
| JP | 2003-018096 | 1/2003 |
| JP | 2005-260820 | 9/2005 |

OTHER PUBLICATIONS

International Search Report, PCT/JP2011/001317, Jun. 7, 2011.
Hideo Tatsuno et al., "Hitless Path Protection Switching Techniques for ATM Networks", The Transactions of the Institute of Electronics, Information and Communication Engineers B-1, 1993.06, vol. J76-BI, No. 6, pp. 421 to 430.
Japanese Official Action—2012-509290—Dec. 10, 2013.

*Primary Examiner* — Sam Rizk
(74) *Attorney, Agent, or Firm* — Young & Thompson

(57) ABSTRACT

When a first communication device receives a predetermined message from a second communication device via a third line (L3) in a state of transmitting frames to a first line (L1) while performing error-correction coding on the frames, the first communication device switches the line used for transmission from L1 to the second line (L2), then transmits a frame of a post-switching message to L1. The second communication device receives frames from L1 and L2 and performs error correction, stores the frames, on which error correction has been performed, in first and second buffers (B1, B2), and when determining that it is necessary to perform line switching based on the status of error correction with respect to the frames received from L1, transmits a predetermined message to L3, and when receiving the frame of the post-switching message from L1, starts reading frames from B2 after reading all frames stored in B1.

10 Claims, 9 Drawing Sheets

TRANSMISSION SYSTEM

TECHNICAL FIELD

The present invention relates to a transmission system in which communication devices are connected via a plurality of lines in order to improve the reliability of communication, and in particular, to a technique of switching lines to be used for communication.

BACKGROUND ART

A 1:1 protection scheme is standardized by ITU-T (International Telecommunication Union) (ITU-T Recommendation G8031). In this scheme, a transmission device and a reception device are connected via two lines in order to improve the reliability of communication, and in the initial state, communication is performed using one of the lines, while at the time of maintenance work or failure, communication is performed using the other line. In particular, in the 1:1 protection standardized by the ITU-T, a line can be switched to another line by the unit of VLAN traffic based on a switching request by a user.

In the 1:1 protection standardized by the ITU-T Recommendation G8031, the line switching sections of a transmission device and a reception device are synchronized with each other to switch a line. Meanwhile, another scheme is also proposed, in which a reception device regularly receives frames from the both lines, and 1:1 protection is realized by only switching the line of the transmission device side (see Patent Document 1, for example).

On the other hand, regarding a 1+1 protection scheme rather than the 1:1 protection, Patent Document 2 describes a technique of performing line switching for preventive maintenance based on the status of error correction of a line. Specifically, the transmission side inputs, to a path, a multi-frame pattern for detecting a transmission delay difference between the active system and the standby system at the reception side to generate a multiplexed SONET/SDH frame, encapsulates the SONET/SDH frame in a frame for FEC (Forward Error correction), and transmits the result to both the active system line and the standby system line. The reception side includes, in each of the active system and the standby system, an FEC function frame reproduction section which extracts the SONET/SDH frame from the received FEC frame, performs error-correction processing by the FEC function, and then transfers error correction information; a demultiplexing section which terminates the path from the generated SONET/SDH frame and establishes synchronization of the multiframe added at the transmission side; a B3 error detection section which compares, with respect to the frame from the demultiplexing section, a parity operation result for each path with the B3 byte of the next path to detect presence or absence of a B3 error; and a delay memory n which data from the B3 error detection section is written in order to offset a transmission path delay difference between the active system and the standby system and which is read at the timing extracted from multiframe synchronization. Further, the reception side includes a switching control section which switches, between the active system and the standby system, data from a delay memory based on the B3 error and the error correction information.

It should be noted that in this description, a frame of the Ethernet (registered trademark) is simply called as a frame or a packet.

Patent-Document 1: JP 10-145374 A
Patent Document 2: JP 2005-260820 A

In the 1:1 protection standardized by the ITU-T, if the switching target line is a high-speed line having a smaller delay quantity compared with that of the switching source line, there is a problem that a packet loss is caused when switching lines. For example, when a transmission device transmits a packet 1, a packet 2, a packet 3, and a packet 4 in this order to the switching source line, and then transmits subsequent packets, namely, a packet 5, a packet 6, a packet 7, and a packet 8, in this order to the switching target line, if the switching target line is a higher-speed line compared with the switching source line, the packets 5 and 6 reach the reception device before the packets 3 and 4 reach the device, as shown in FIG. 9. As such, if line switching is performed immediately after the packet 2 is received from the switching source line, the packets 3 and 4 will be lost. On the contrary, if line switching is performed immediately after the packet 4 is received from the switching source line, the packets 5 and 6 will be lost.

On the other hand, in the scheme described in Patent-Document 1, as the reception device is able to receive not only the packets 1 to 4 but also the packets 5 to 8, a packet loss can be prevented. However, a state where the packets 5 and 6 are received before the packets 3 and 4 may be caused. As such, there is a problem that the sequence of the packets will be changed.

Further, although switching lines for preventive maintenance based on the status of error correction of the received frames is performed in the 1+1 protection scheme as described in Patent Document 2, a case of applying such a technique to the 1:1 protection scheme has not been found. The grounds are as follows: as the status of error correction of the received frames is only detected by the reception side, it is considered difficult to apply the technique to the 1:1 protection in which path switching is performed at the transmission side; and as a packet loss or a change in the sequence of packets is caused if there is any delay difference between the two lines in the 1:1 protection as described above, preventive maintenance cannot be realized.

SUMMARY

An object of the present invention is to provide a transmission system capable of solving a problem that in the 1:1 protection, as a packet loss or a change in the sequence of packets is caused if there is any delay difference between the two lines, line switching for preventive maintenance cannot be performed.

A transmission system, according to an aspect of the present invention, is configured such that a first communication device and a second communication device are connected with each other via a first line to be used for transmitting frames of traffic from the first communication device to the second communication device while performing error-correction coding on the frames, a second line to be used when the first line is in failure, and a third line to be used for transmission from the second communication device to the first communication device, wherein the second communication device includes a first buffer which stores the frames received from the first line, and a second buffer which stores the frames received from the second line, when the second communication device determines that it is necessary to perform line switching from the first line to the second line based on a status of error correction with respect to the frames received from the first line, the second communication device transmits a predetermined message to the first communication device via the third line, when the first communication device receives the predetermined message via the third line, the first communication device transmits a frame of a post-switching message to the first line after switching the line used for transmission from the first line to the second line, and when the second communication device receives the post-switching message from the first line, the second communication device starts reading of the frames from the second buffer after reading all of the frames stored in the first buffer.

A transmission method, according to another aspect of the present invention, is a method implemented by a transmission system including a first communication device and a second communication device, the first communication device and the second communication device being connected with each other via a first line to be used for transmitting frames of traffic from the first communication device to the second communication device while performing error-correction coding on the frames, a second line to be used when the first line is in failure, and a third line to be used for transmission from the second communication device to the first communication device, the second communication device including a first buffer which stores the frames received from the first line, and a second buffer which stores the frames received from the second line, the method comprising:

by the second communication device, when determines that it is necessary to perform line switching from the first line to the second line based on a status of error correction with respect to the frames received from the first line, transmitting a predetermined message to the first communication device via the third line, by the first communication device, when receiving the predetermined message via the third line, transmitting a frame of a post-switching message to the first line after switching the line used for transmission from the first line to the second line, and by the second communication device, when receiving the post-switching message from the first line, starting reading of the frames from the second buffer after reading all of the frames stored in the first buffer.

Further, a communication device, according to another aspect of the present invention, is a communication device connected with another communication device via a first line to be used for transmitting frames of traffic while performing error-correction coding on the frames, a second line to be used when the first line is in failure, a third line to be used for transmitting frames of traffic while performing error-correction coding on the frames, and a fourth line to be used when the third line is in failure, wherein the communication device includes a first buffer which stores the frames received from the first line, and a second buffer which stores the frames received from the second line, and the communication device is adapted to when determining that it is necessary to perform line switching from the first line to the second line based on a status of error correction with respect to the frames received from the first line in a normal operation state, after switching the line used for transmission from the third line to the fourth line, transmit a frame of a post-switching message to the third line and allow the state of the communication device to be changed to a post-switching event message reception waiting state, and when receiving the post-switching message from the first line in the post-switching event message reception waiting state, perform reception section switching in which the communication device starts reading of the frames from the second buffer after reading all of the frames stored in the first buffer, and then allow the state of the communication device to be changed to the normal operation state, and when receiving the post-switching message from the first line in the normal operation state, perform reception section switching in which the communication device starts reading of the frames from the second buffer after reading all of the frames stored in the first buffer, and after switching the line used for transmission from the third line to the fourth line, transmit a frame of the post-switching message to the third line and allow the state of the communication device to be changed to the normal operation state.

As the present invention has the configuration as described above, it is possible to perform line switching for preventive maintenance based on the statues of error correction of received frames without causing a packet loss or a change in the sequence of packets even if there is any delay difference between the first line and the second line. As such, switching can be performed during the time when error correction by the FEC is compensated, so that a frame loss will never be caused by an error, which enables hitless switching.

EXEMPLARY EMBODIMENTS

Figure 1:
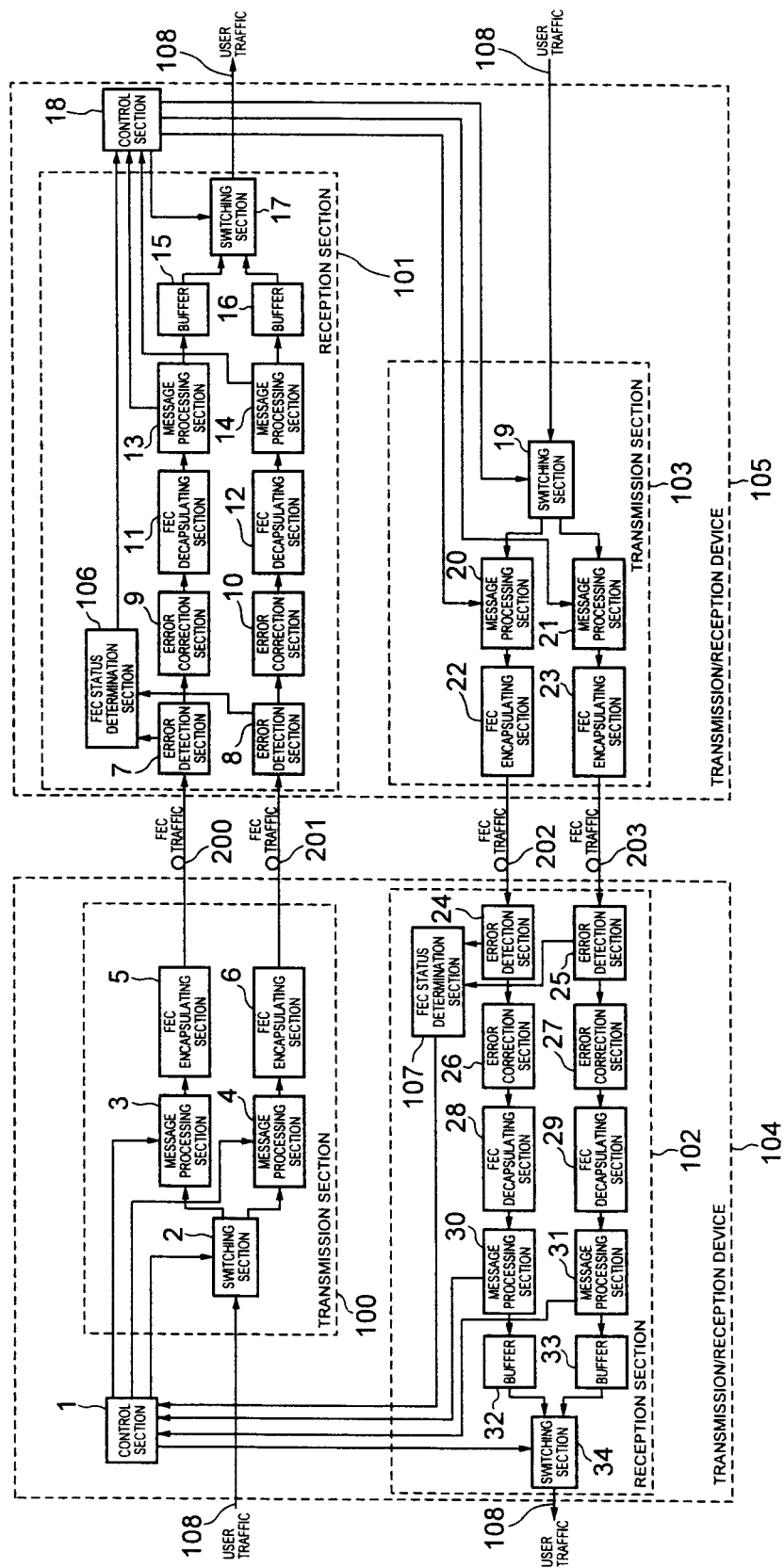
FIG. 1 is a block diagram showing a second exemplary embodiment of the present invention.

Next, exemplary embodiments of the present invention will be described in detail with reference to the drawings.
First Exemplary Embodiment Referring to FIG. 8, a transmission system according to a first exemplary embodiment of the present invention is configured such that a communication device 810 and a communication device 820 are connected with each other via a line 831 and a line 832 to be used for transmission from the communication device 810 to the communication device 820, and via a line 833 to be used for transmission from the communication device 820 to the communication device 810.

The communication device 810 has a function of, when receiving a predetermined message from the line 833 in a state of transmitting the frames of traffic 840 such as user traffic to the line 831 while performing error-correction coding on the frames, switching the line used for transmission from the line 831 to the line 832, and then transmitting a frame of a post-switching message to the line 831.

The communication device 820 has a function of receiving the frames from the line 831 and the line 832 and performing error correction, storing the frames on which the error correction has been performed in buffers 885 and 886, and transmitting the predetermined message to the line 833 when determining that line switching is necessary based on the status of error correction with respect to the frames received from the line 831. The communication device 820 also has a function of, when receiving a frame of a post-switching message from the line 831, starting reading of the frames from the buffer 886 after reading all of the frames stored in the buffer 885.

As the transmission system of the present embodiment has the configuration as described above, even if there is a delay difference between the line 831 and the line 832, it is possible to switch the lines from the line 831 to the normal line 832 for preventive maintenance based on the status of error correction of the line 831, without causing a packet loss or a change in the sequence of packets.

For example, it is assumed that the communication device 810 receives a predetermined message from the line 833 after transmitting, to the line 831, a packet 1, a packet 2, a packet 3, and a packet 4 in this order. In this case, after switching the line, the communication device 810 transmits a post-switching message to the line 831, and transmits subsequent packets, namely, a packet 5, a packet 6, a packet 7, and a packet 8 in this order to the line 832. As the line 832 has a higher speed than the line 831, even if the packets 5 and 6 reach the communication device 820 earlier than the packets 3 and 4, the post-switching message has not reached the communication device 820. As such, the packets 5 and 6 remain stored in the buffer 886. When the packets 3 and 4 reach the communication device 820 later than the packets 5 and 6, the packets 3 and 4 are first stored in the buffer 885. Then, when the communication device 820 receives the post-switching message via the line 831, the communication device 820 performs line switching. Thereby, the packets 3 and 4 stored in the buffer 885 are first read and output to the outside, and then the packets 5 and 6 stored in the buffer 886 are read. As a result, the packets 1, 2, 3, 4, 5, 6, 7, and 8 are output in this order from the communication device 820 to the outside, whereby a packet loss or a change in the sequence of the packets will not be caused.

While the basic configuration of the present embodiment is as described above, various additions and changes can be made. For example, the communication device 810 may transmit a frame of a pre-switching message to the line 832 before starting transmission of the frames to the line 832.

Figure 8:
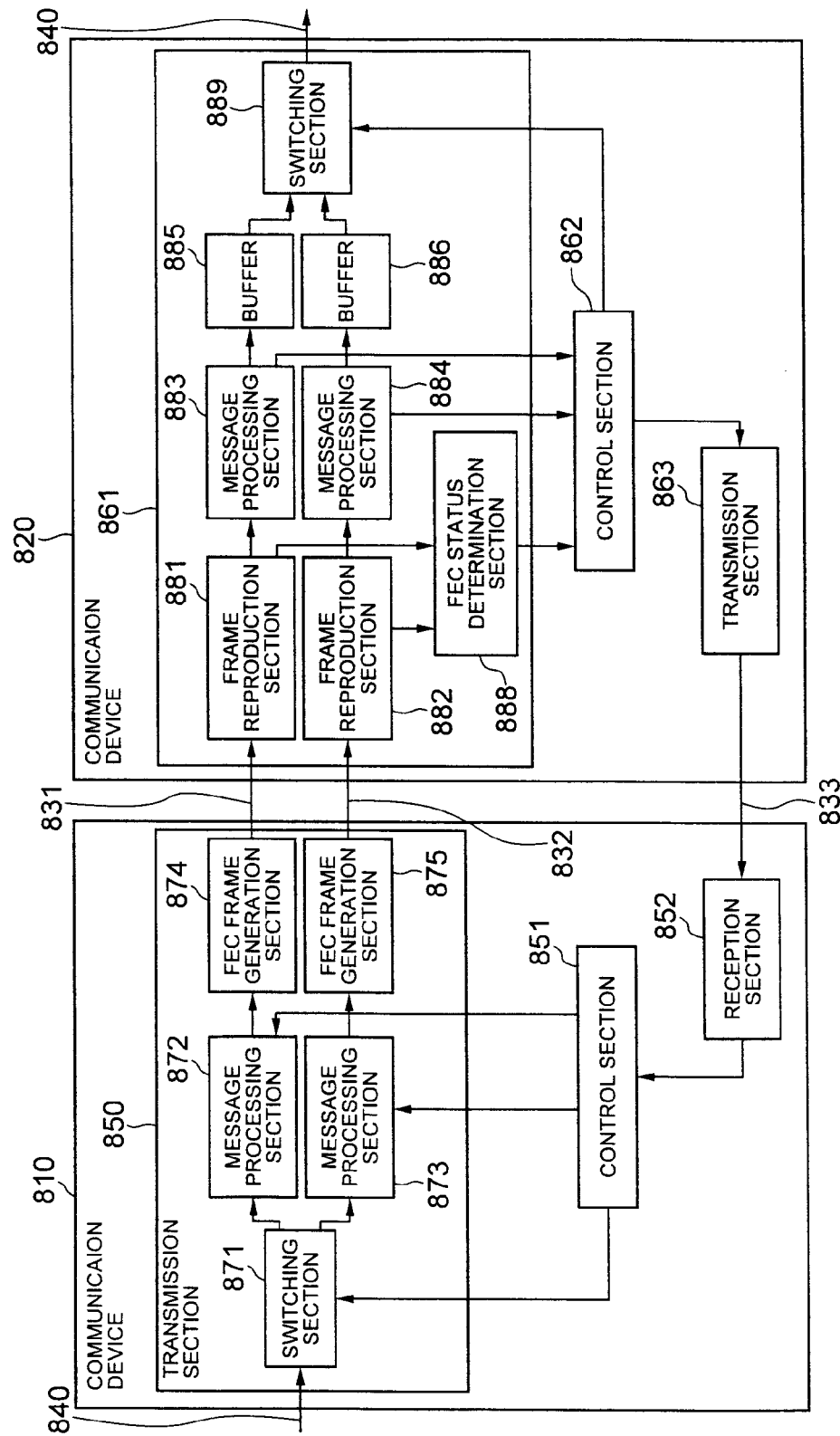
FIG. 8 is a block diagram showing a first exemplary embodiment of the present invention.
Figure 9:
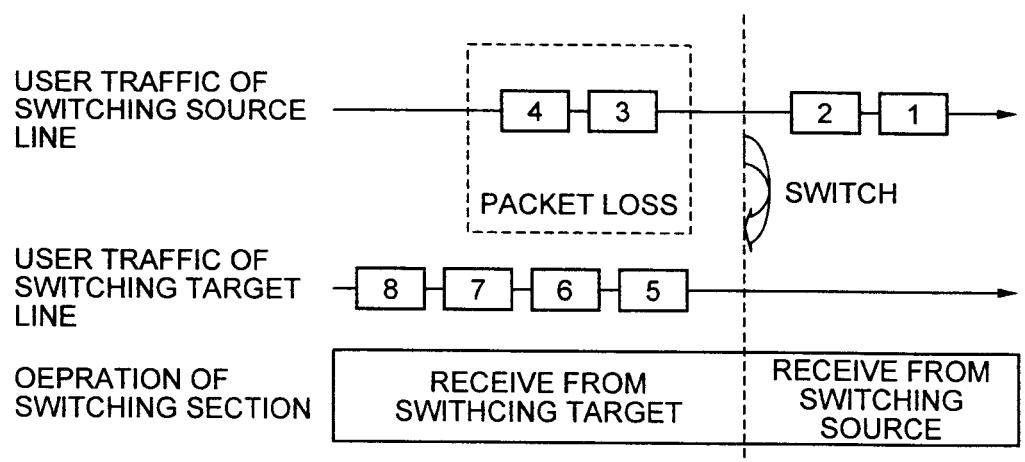
FIG. 9 is an illustration showing the problem to be solved by the present invention.

Further, as shown in FIG. 8, the communication device 810 may include a transmission section 850 connected with the lines 831 and 832, a reception section 852 connected with the line 833, and a control section 851. Further, the transmission section 850 may include a switching section 871, message processing sections 872 and 873, an FEC frame generation section 874 connected with the line 831, and an FEC frame generation section 875 connected with the line 832. These sections may have the following functions.

The control section 851 has a function of, when receiving a predetermined message from the line 833, outputting a pre-switching message transmission command signal to the message processing section 873, and after outputting a switching command signal to the switching section 871, upon completion of switching by the switching section 871, outputting a post-switching message transmission command signal to the message processing section 872.

The switching section 871 outputs the frames of the traffic to the message processing section 872 in the initial state, and when receiving the switching command signal, outputs the frames of the traffic to the message processing section 873. The message processing section 873 transmits a frame of a pre-switching message to the FEC frame generation section 875 based on the pre-switching message transmission command, and then outputs the frames of the traffic, input from the switching section 871, to the FEC frame generation section 875. The FEC frame generation section 875 encapsulates the input frames in an FEC frame, and outputs it to the line 832.

The message processing section 872 outputs the frames of the traffic, input from the switching section 871, to the FEC frame generation section 874, and also outputs a frame of a post-switching message to the FEC frame generation section 874 based on the post-switching message transmission command. The FEC frame generation section 874 encapsulates the input frames into an FEC frame, and outputs it to the line 831.

Further, the communication device 820 may include a reception section 861 connected with the lines 831 and 832, a transmission section 863 connected with the line 833, and a control section 862. The reception section 861 may include a frame reproduction section 881 connected with the line 831, a frame reproduction section 882 connected with the line 832, message processing sections 883 and 884, buffers 885 and 886, an FEC status determination section 888, and a switching section 889. These sections may have the following functions.

The frame reproduction section 881 has a function of performing error-correction processing of the FEC frame received from the line 831 to reproduce the encapsulated frame and outputting it to the message processing section 883, and also notifying the FEC status determination section 888 of error correction information. The error correction information may include information such as presence or absence of occurrence of an FEC error, the size of an FEC error, presence or absence or FEC correction, and the magnitude of FEC correction. The frame reproduction section 882 has a function of performing error-correction processing of the FEC frame received from the line 832 to reproduce the encapsulated frame and outputting it to the message processing section 884, and notifying the FEC status determination section 888 of error correction information.

The message processing section 883 outputs the input frame to the buffer 885 if the input frame is a frame of the traffic, while outputs the input frame to the control section 862 if the input frame is a frame of a post-switching message. The message processing section 884 outputs the input frame to the buffer 886 if the input frame is a frame of the traffic, while outputs the input frame to the control section 862 if the input frame is a frame of a pre-switching message.

The FEC status determination section 888 determines the necessity of line switching from the line 831 to the line 832 based on the notified error correction information, and outputs a switching request signal to the control section 862. When the control section 862 receives a pre-switching message, the control section 862 notifies the buffer 886 to start buffering of the traffic. Further, when the control section 862 receives a post-switching message, the control section 862 outputs a switching command signal to the switching section 889, and when receiving a switching request signal, transmits the predetermined message to the line 833 by the means of the transmission section 863.

As the predetermined message, the pre-switching message, the post-switching message, or any other messages may be used.

Second Exemplary Embodiment
(Description of Configuration)

Referring to FIG. 1, a transmission system according to a second exemplary embodiment of the present invention includes transmission/reception devices 104 and 105, and four lines 200, 201, 202, and 203 connecting the devices 104 and 105.

Each of the line 200 and the line 201 may be formed of one communication line or one transmission path, or formed of a plurality of communication lines or transmission paths connected via relay devices. Further, in the line 200 and the line 201, a delay time of a packet transmitted from the transmission/reception device 104 until it reaches the transmission/reception device 105 may be almost the same or different.

Each of the line 202 and the line 203 may be formed of one communication line or one transmission path, or formed of a plurality of communication lines or transmission paths connected via relay devices. Further, in the line 202 and the line 203, a delay time of a packet transmitted from the transmission/reception device 105 until it reaches the transmission/reception device 104 may be almost the same or different.

The transmission/reception device 104 includes a transmission section 100 which performs error-correction coding on user traffic 108 input from the outside, and transmits it to the transmission/reception device 105 using either the line 200 or the line 201. Further, the transmission/reception device 104 includes a reception section 102 which performs error correction on the user traffic 108 received from the line 202 or the line 203 and outputs it to the outside. Further, the transmission/reception device 104 includes a control section 1 which controls switching of lines used by the transmission section 100 and the reception section 102.

The transmission/reception device 105 includes a transmission section 103 which performs error-correction coding on the user traffic 108 input from the outside, and transmits it to the transmission/reception device 104 using either the line 202 or the line 203. Further, the transmission/reception device 105 includes a reception section 101 which performs error correction on the user traffic 108 received from the line 200 or the line 201 and outputs it to the outside. Further, the transmission/reception device 105 includes a control section 18 which controls switching of lines used by the transmission section 103 and the reception section 101.

In the initial state, the transmission system of the present embodiment transmits the user traffic 108 from the transmission/reception device 104 to the transmission/reception device 105 using the line 200, and transmits the user traffic 108 from the transmission/reception device 105 to the transmission/reception device 104 using the line 202. When the transmission/reception device 105 determines that the state of the line 200 is deteriorated based on the status of error correction of the traffic received via the line 200, in order to request the transmission/reception device 104 to switch the line, the transmission/reception device 105 purposely switches the line, used to transmitting the traffic from the transmission/reception device 105 to the transmission/reception device 104, from the line 202 to the line 203. When the transmission/reception device 104 detects that the transmission/reception device 105 switches the line used for transmission from the line 202 to the line 203, the transmission/reception device 104 switches the line used for receiving the traffic from the line 202 to the line 203, and also switches the line used for transmitting the traffic from the transmission/reception device 105, from the line 200 to the line 201. Thereby, the user traffic 108 is transmitted from the transmission/reception device 104 to the transmission/reception device 105 with use of the line 201 instead of the line 200 in which the state is deteriorated.

Further, in the initial state, when the transmission/reception device 104 determines that the state of the line 202 is deteriorated based on the status of error correction of the traffic received via the line 202, in order to request the transmission/reception device 105 to switch the line, the transmission/reception device 104 purposely switches the line, used to transmit the traffic from the transmission/reception device 104 to the transmission/reception device 105, from the line 200 to the line 201. When the transmission/reception device 105 detects that the transmission/reception device 104 switches the line used for transmission from the line 200 to the line 201, the transmission/reception device 105 switches the line used for receiving the traffic from the line 200 to the line 201, and also switches the line used for transmitting the traffic from the transmission/reception device 105 to the transmission/reception device 104, from the line 202 to the line 203. Thereby, the user traffic 108 is transmitted from the transmission/reception device 105 to the transmission/reception device 104 with use of the line 203 instead of the line 202 in which the state is deteriorated.

Next, the reception section 101, the transmission section 103, and the control section 18, constituting the transmission/reception device 105, will be described in detail.

The reception section 101 includes error detection sections 7 and 8, error correction sections 9 and 10, FEC decapsulating sections 11 and 12, message processing sections 13 and 14, buffers 15 and 16, a switching section 17, and an FEC status determination section 106. These sections have the following functions, respectively.

The error detection section 7 detects an FEC error in the FEC traffic received from the line 200, and transmits the FEC traffic to the error correction section 9. Further, the error detection section 7 transmits an FEC error detection signal to the FEC status determination section 106 upon detection of the FEC error.

The error detection section 8 detects an FEC error in the FEC traffic received from the line 201, and transmits the FEC traffic to the error correction section 10. Further, the error detection section 8 transmits an FEC error detection signal to the FEC status determination section 106 upon detection of the FEC error.

The error correction section 9 transmits the FEC traffic from the error detection section 7 to the FEC decapsulating section 11. When an FEC error is detected by the error detection section 7, the error correction section 9 corrects the FEC error and transmits it to the FEC decapsulating section 11.

The error correction section 10 transmits the FEC traffic from the error detection section 8 to the FEC decapsulating section 12. When an FEC error is detected by the error detection section 8, the error correction section 10 corrects the FEC error and transmits it to the FEC decapsulating section 12.

The FEC decapsulating section 11 decapsulates the FEC traffic from the error correction section 9 into a plurality of Ethernet frames. Then, the FEC decapsulating section 11 transmits the decapsulated Ethernet frames to the message processing section 13.

The FEC decapsulating section 12 decapsulates the FEC traffic from the error correction section 10 into a plurality of Ethernet frames. Then, the FEC decapsulating section 12 transmits the decapsulated Ethernet frames to the message processing section 14.

The message processing section 13 separates the user traffic and an event message from the traffic received from the FEC decapsulating section 11, transmits the user traffic to the buffer 15, and transmits the event message to the control section 18.

The message processing section 14 separates the user traffic and an event message from the traffic received from the FEC decapsulating section 12, transmits the user traffic to the buffer 16, and transmits the event message to the control section 18.

The buffer 15 is able to temporarily store the user traffic from the message processing section 13, and in accordance with a readout request from the switching section 17, transmits the user traffic to the switching section 17. The readout user traffic is deleted from the buffer 15.

The buffer 16 is able to temporarily store the user traffic from the message processing section 14, and in accordance with a readout request from the switching section 17, transmits the user traffic to the switching section 17. The readout user traffic is deleted from the buffer 16.

The switching section 17 reads the user traffic from the buffer 15 and transmits it to the outside in the initial state where the line 200 is used. The switching section 17 switches the buffer from which the user traffic is read, from the buffer 15 to the buffer 16 in accordance with a switching command signal from the control section 18.

The FEC status determination section 106 records the occurrence times and the number of occurrences of FEC errors regarding the line 200, in accordance with error detection signals of the error detection section 7. Further, the FEC status determination section 106 records the occurrence times and the number of occurrences of FEC errors regarding the line 201, in accordance with error detection signals of the error detection section 8. Then, in the initial state using the line 200, if the FEC status determination section 106 determines that the FEC status of the line 200 is deteriorated to a level requiring line switching such that it has burst and multiple FEC errors have occurred, the FEC status determination section 106 transmits a switching request signal of the line 200 to the control section 18.

The condition that the FEC status determination section 106 transmits a switching request signal will be described in more detail (this also applies to the FEC status determination section 107 described below). For example, the FEC status determination section 106 records the occurrence time of an FEC error each time the error occurs. As an FEC error is corrected by the error correction section in the latter stage, recording the occurrence time each time an FEC error occurs is equal to recording the correction time each time the FEC error is corrected. Each time the FEC status determination section 106 takes a new record, the FEC status determination section 106 compares the number of records per unit time immediately before, that is, the number of error occurrences (corrections), with a preset threshold. Then, if the number of error occurrences (corrections) per unit time does not exceed the threshold, the FEC status determination section 106 determines that the possibility of occurrence of an error, which is uncorrectable by FEC, is low in the line 200. On the contrary, if the number of error occurrences (corrections) per unit time exceeds the threshold, the FEC status determination section 106 determines that the line state has been deteriorated such that it is highly likely that an error, which is uncorrectable by FEC, occurs in the line 200, and so transmits a switching request signal in order to perform line switching within the time that all errors can be compensated by FEC.

The number of error occurrences (corrections), to be compared with the threshold by the FEC status determination section 106, may be the number of FEC error occurrences (corrections) of 1 bit or larger, or the number of FEC error occurrences (corrections) of 2 bits or larger. Further, determination may be performed not only using the number of FEC error occurrences (correction) but also the size of the error (the size of the corrected number of bits). For example, it is possible to obtain an evaluation value which becomes larger as the number of FEC error occurrences (corrections) per unit time increases and as the number of bits of the error (correction) increases, and compare the evaluation value with a threshold to thereby determine the necessity of switching.

The transmission section 103 includes a switching section 19, message processing sections 20 and 21, and FEC encapsulating sections 22 and 23. These sections have the following functions, respectively.

The switching section 19 transmits the user traffic 108 to the message processing section 20 in the initial state. The switching section 19 switches the transmission direction of the user traffic from the message processing section 20 to the message processing section 21 in accordance with a switching command signal from the control section 18.

The message processing section 20 transmits the user traffic from the switching section 19 to the FEC encapsulating section 22. Further, the message processing section 20 generates an event message in accordance with an event message transmission command signal from the control section 18, combines it with the user traffic, and transmits the result to the FEC encapsulating section 22.

The message processing section 21 transmits the user traffic from the switching section 19 to the FEC encapsulating section 23. Further, the message processing section 21 generates an event message in accordance with an event message transmission command signal from the control section 18, combines it with the user traffic, and transmits the result to the FEC encapsulating section 23.

The FEC encapsulating section 22 is able to temporarily store the user traffic from the message processing section 20 in the internal buffer, and encapsulates a plurality of Ethernet frames into one FEC frame. The FEC encapsulating section 22 deletes the Ethernet frames, which have been encapsulated, from the internal buffer, and transmits the generated FEC frame to the line 202. In the present embodiment, as a plurality of Ethernet frames are encapsulated in one FEC frame, it is not necessary to apply a useless header to each frame, so that the band can be used effectively.

The FEC encapsulating section 23 is able to temporarily store the user traffic from the message processing section 21 in the internal buffer, and encapsulates a plurality of Ethernet frames into one FEC frame. The FEC encapsulating section 23 deletes the Ethernet frames, which have been encapsulated, from the internal buffer, and transmits the generated FEC frame to the line 203.

Figure 2:
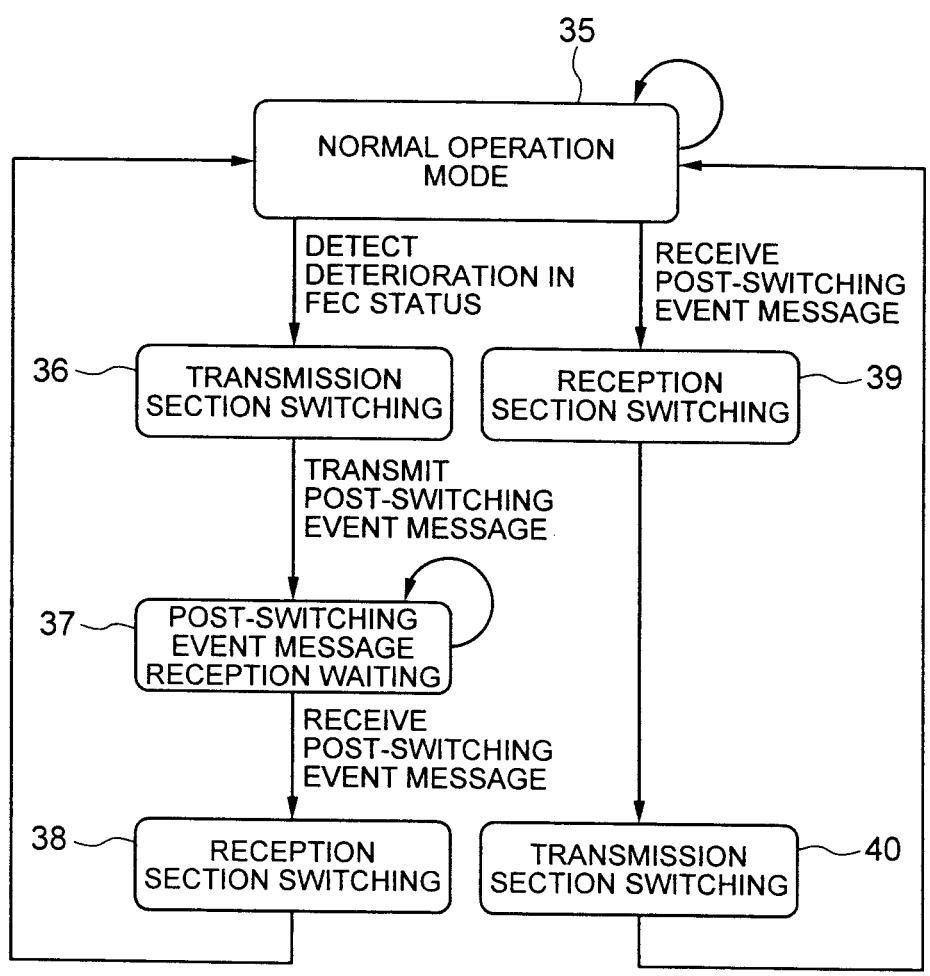
FIG. 2 is a state transition diagram of a control section of a transmission/reception device according to the second exemplary embodiment of the present invention.

The control section 18 controls switching of the lines used by the transmission section 103 and the reception section 101, in accordance with the state transition diagram shown in FIG. 2. In the initial state, the control section 18 performs operation in a normal operation mode (state 35 in FIG. 2). In the normal operation mode (state 35), when the control section 18 receives a switching request signal of the line 200 from the FEC status determination section 106 because the FEC status determination section 106 has detected deterioration in the FEC status, the control section 18 performs transmission section switching (state 36), and allows the state of the control section 18 to be changed to a post-switching event message reception waiting state (state 37). In the transmission section switching in the state 36, the control section 18 transmits a pre-switching event message transmission command signal to the message processing section 21, and transmits a switching command signal to the switching section 19. Then, upon completion of the switching, the control section 18 transmits a post-switching event message transmission command signal to the message processing section 20. In the post-switching event message reception waiting state 37, when the control section 18 is notified from the message processing section 13 that the post-switching event message has been received, the control section 18 performs reception section switching (state 38). In the reception section switching, the control section 18 transmits a switching command signal to the switching section 17. Then, the control section 18 returns to the normal operation mode (state 35).

On the other hand, in the normal operation mode (state 35), when the control section 18 receives a post-switching event message from the message processing section 13, the control section 18 performs reception section switching (state 39), and further performs transmission section switching (state 40), and returns to the normal operation mode (state 35). In the reception section switching in the state 39, the control section 18 transmits a switching command signal to the switching section 17. Further, in the transmission section switching in the state 40, the control section 18 transmits a pre-switching event message transmission command signal to the message processing section 21, and transmits a switching command signal to the switching section 19. Further, upon completion of the switching, the control section 18 transmits a post-switching event message transmission command signal to the message processing section 20.

Next, the reception section 102, the transmission section 100, and the control section 1, constituting the transmission/reception device 104, will be described in detail.

The reception section 102 includes error detection sections 24 and 25, error correction sections 26 and 27, FEC decapsulating sections 28 and 29, message processing sections 30 and 31, buffers 32 and 33, a switching section 34, and an FEC status determination section 107. These sections have the following functions, respectively.

The error detection section 24 detects an FEC error in the FEC traffic received from the line 202, and transmits the FEC traffic to the error correction section 26. Further, the error detection section 24 transmits an FEC error detection signal to the FEC status determination section 107 upon detection of the FEC error.

The error detection section 25 detects an FEC error in the FEC traffic received from the line 203, and transmits the FEC traffic to the error correction section 27. Further, the error detection section 25 transmits an FEC error detection signal to the FEC status determination section 107 upon detection of the FEC error.

The error correction section 26 transmits the FEC traffic from the error detection section 24, to the FEC decapsulating section 28. Further, when an FEC error is detected by the error detection section 24, the error correction section 26 corrects the FEC error, and transmits the result to the FEC decapsulating section 28.

The error correction section 27 transmits the FEC traffic from the error detection section 25, to the FEC decapsulating section 29. Further, when an FEC error is detected by the error detection section 25, the error correction section 27 corrects the FEC error, and transmits the result to the FEC decapsulating section 29.

The FEC decapsulating section 28 decapsulates the FEC traffic from the error correction section 26 into a plurality of Ethernet frames. Then, the FEC decapsulating section 28 transmits the decapsulated Ethernet frames to the message processing section 30.

The FEC decapsulating section 29 decapsulates the FEC traffic from the error correction section 27 into a plurality of Ethernet frames. Then, the FEC decapsulating section 29 transmits the decapsulated Ethernet frames to the message processing section 31.

The message processing section 30 separates the user traffic and the event message from the traffic received from the FEC decapsulating section 28, transmits the user traffic to the buffer 32, and transmits the event message to the control section 1.

The message processing section 31 separates the user traffic and the event message from the traffic received from the FEC decapsulating section 29, transmits the user traffic to the buffer 33, and transmits the event message to the control section 1.

The buffer 32 is able to temporarily store the user traffic from the message processing section 30, and in accordance with a readout request from the switching section 34, transmits the user traffic to the switching section 34. The readout user traffic is deleted from the buffer.

The buffer 33 is able to temporarily store the user traffic from the message processing section 31, and in accordance with a readout request from the switching section 34, transmits the user traffic to the switching section 34. The readout user traffic is deleted from the buffer.

The switching section 34 reads the user traffic from the buffer 32 in the initial state, and transmits it to the outside. Further, the switching section 34 switches the buffer from which the user traffic is read, from the buffer 32 to the buffer 33 in accordance with a switching command signal from the control section 1.

The FEC status determination section 107 records the occurrence times and the number of occurrences of FEC errors regarding the line 202, in accordance with error detection signals of the error detection section 24. Further, the FEC status determination section 107 records the occurrence times and the number of occurrences of FEC errors regarding the line 203, in accordance with error detection signals of the error detection section 25. Then, in the initial state using the line 202, if the FEC status determination section 107 determines that the FEC status of the line 202 is deteriorated to a level requiring line switching such that it has burst and multiple FEC errors have occurred, the FEC status determination section 107 transmits a switching request signal of the line 202 to the control section 1.

The transmission section 100 includes a switching section 2, message processing sections 3 and 4, and FEC encapsulating sections 5 and 6. These sections have the following functions, respectively.

The message processing section 3 transmits the user traffic from the switching section 2, to the FEC encapsulating section 5. Further, in accordance with an event message transmission command signal from the control section 1, the message processing section 3 generates an event message, combines it with the user traffic, and transmits the result to the FEC encapsulating section 5.

The message processing section 4 transmits the user traffic from the switching section 2, to the FEC encapsulating section 6. Further, in accordance with an event message transmission command signal from the control section 1, the message processing section 4 generates an event message, combines it with the user traffic, and transmits the result to the FEC encapsulating section 6.

The switching section 2 transmits the user traffic 108 to the message processing section 3 in the initial state. Then, the switching section 2 switches the transmission direction of the user traffic 108 from the message processing section 3 to the message processing section 4 in accordance with a switching command signal from the control section 1.

The FEC encapsulating section 5 is able to temporarily store the user traffic from the message processing section 3 in the internal buffer, and encapsulates a plurality of Ethernet frames into one FEC frame. The FEC encapsulating section 5 deletes the encapsulated Ethernet frames from the internal buffer, and transmits the FEC frame to the line 200.

The FEC encapsulating section 6 is able to temporarily store the user traffic from the message processing section 4 in the internal buffer, and encapsulates a plurality of Ethernet frames into one FEC frame. The FEC encapsulating section 6 deletes the encapsulated Ethernet frames from the internal buffer, and transmits the FEC frame to the line 201.

The control section 1 controls switching of the lines used by the transmission section 100 and the reception section 102 in accordance with the state transition diagram shown in FIG. 2. In the initial state, the control section 1 performs operation in a normal operation mode (state 35 in FIG. 2). In the normal operation mode (state 35), when the control section 1 receives a switching request signal of the line 202 from the FEC status determination section 106 because the FEC status determination section 106 has detected deterioration in the FEC status, the control section 1 performs transmission section switching (state 36), and allows the state of the control section to be changed to a post-switching event message reception waiting state (state 37). In the transmission section switching in the state 36, the control section 1 transmits a pre-switching event message transmission command signal to the message processing section 4, and transmits a switching command signal to the switching section 2. Upon completion of the switching, the control section 1 transmits a post-switching event message transmission command signal to the message processing section 3. In the post-switching event message reception waiting state 37, when the control section 1 is notified that the post-switching event message is received from the message processing section 30, the control section 1 performs reception section switching (state 38). In the reception section switching, the control section 1 transmits a switching command signal to the switching section 34. Then, the control section 1 returns to the normal operation mode (state 35).

On the other hand, in the normal operation mode (state 35), when the control section 1 receives a post-switching event message from the message processing section 30, the control section 1 performs a reception section switching (state 39), and further performs transmission section switching (state 40), and returns to the normal operation mode (state 35). In the reception section switching in the state 39, the control section 1 transmits a switching command signal to the switching section 34. Further, in the transmission section switching in the state 40, the control section 1 transmits a pre-switching event message transmission command signal to the message processing section 4, and transmits a switching command signal to the switching section 2. Further, upon completion of the switching, the control section 1 transmits a post-switching event message transmission command signal to the message processing section 3.

In FIG. 1, the switching section 2, the switching section 17, the switching section 19, and the switching section 34 can be realized by blocks of switching section in the 1:1 scheme of the Ethernet Linear Protection (ITU-T Recommendation, G8031). The control section 1, the message processing section 3, the message processing section 4, the message processing section 30, the message processing section 31, the control section 18, the message processing section 13, the message processing section 14, the message processing section 20, and the message processing section 21 can be realized by adding functions, based on the similar function blocks in the 1:1 scheme of the Ethernet Linear Protection. Further, a pre-switching event message and a post-switching event message, generated by the message processing section 3, the message processing section 4, the message processing section 20, and the message processing section 21, can be realized by a VSM (Vendor-Specific OAM Message) defined in the Ethernet OAM (ITU-T Recommendation, Y.1731). A VSM to be used as a pre-switching event message and a VSM to be used as a post-switching event message can be distinguished from each other according to the value set to an operation code (OpCode), for example, in an Ethernet OAM frame.

(Description of Operation)

Next, operation of the present embodiment will be described with reference to FIGS. 3 to 6. FIGS. 3 to 6 show sequences of switching a line from the line 200 to the line 201 for preventive maintenance because of the state of the line 200 being deteriorated to a level requiring line switching, during operation in the initial state. First, an outline of the operation will be described.

In the initial state, the transmission system is in the following state. The transmission/reception device 104 transmits user traffic to the transmission/reception device 105 via the line 200, and the transmission/reception device 105 receives the traffic via the line 200.

As such, the switching section 2 transmits the user traffic in the direction of the message processing section 3, and the switching section 17 reads the user traffic from the buffer 15. Further, the transmission/reception device 105 transmits user traffic to the transmission/reception device 104 via the line 202, and the transmission/reception device 104 receives the traffic via the line 202. As such, the switching section 19 transmits the user traffic in the direction of the message processing section 20, and the switching section 34 reads the user traffic from the buffer 32.

In the initial state as described above, when the reception section 101 of the transmission/reception device 105 detects deterioration in the FEC status of the line 200, the following operation will be performed.

Figure 3:
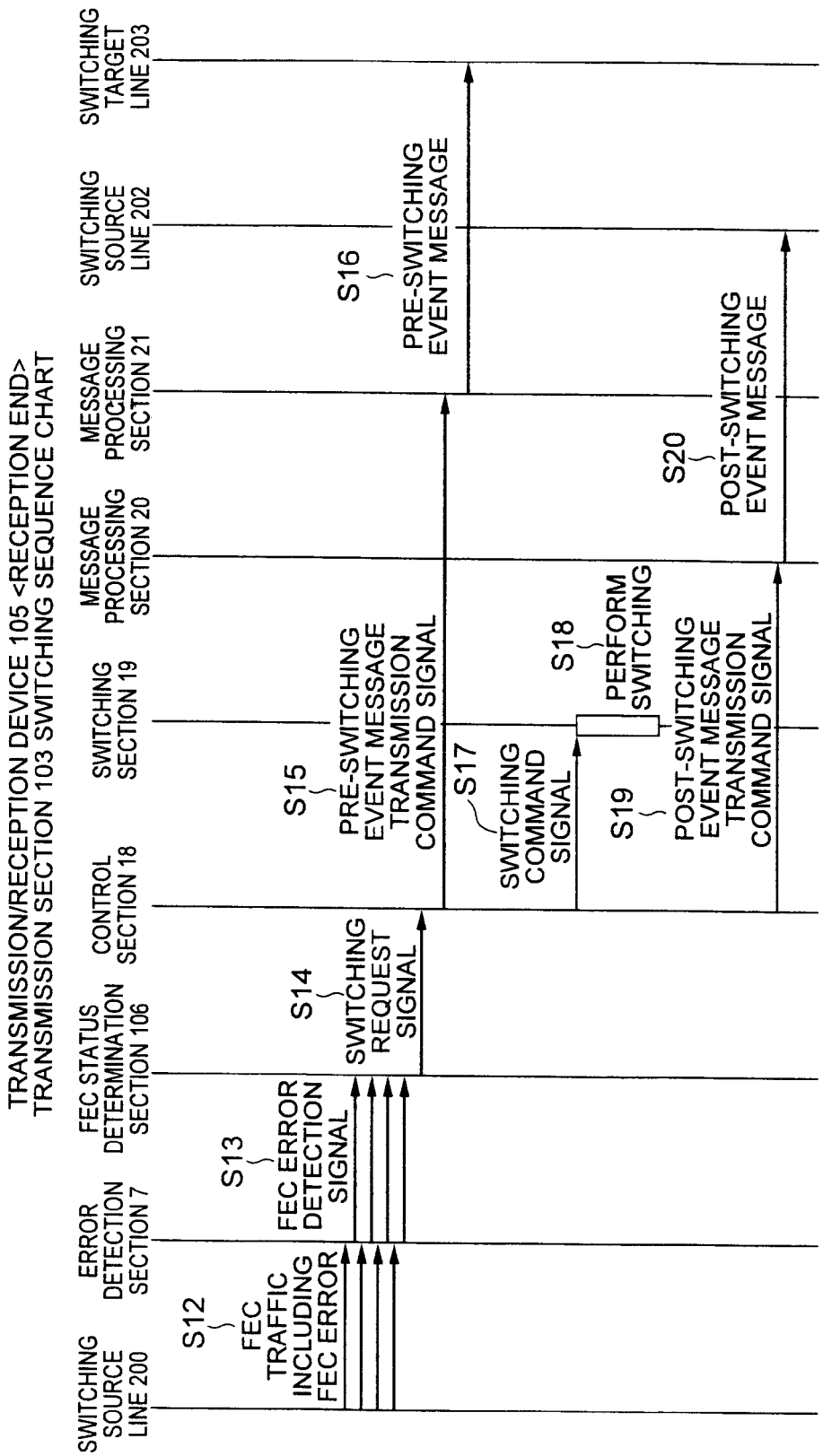
FIG. 3 is a chart showing a transmission section switching sequence of one transmission/reception device according to the second exemplary embodiment of the present invention.

First, the transmission/reception device 105 performs a switching sequence shown in FIG. 3, and transmits a pre-switching event message and a post-switching event message to the transmission/reception device 104. Then, in accordance with the pre-switching event message and the post-switching event message from the transmission/reception device 105, the transmission/reception device 104 performs a switching sequence of the reception section 102 shown in FIG. 4. Further, the transmission/reception device 104 performs a switching sequence of the transmission section 100 shown in FIG. 5, in parallel with the switching sequence of the reception section 102, and transmits a pre-switching event message and a post-switching event message to the transmission/reception device 105. Finally, the transmission/reception device 105 performs a switching sequence of the reception device 101 shown in FIG. 6, in accordance with the pre-switching event message and the post-switching event message from the transmission/reception device 104. Hereinafter, the details of the sequences will be described.

First, the switching operation of the transmission section 103 in the transmission/reception device 105 shown in FIG. 1 will be described with reference to the sequence chart of FIG. 3.

In FIG. 1, when the error detection section 7 receives traffic including an FEC error from the switching source line 200 (step S12 in FIG. 3), the error detection section 7 detects the FEC error, and transmits an FEC error detection signal to the FEC status determination section 106 step S13). When the FEC status determination section 16 determines that the switching source line 200 is deteriorated to a level requiring switching upon reception of the FEC error detection signal, the FEC status determination section 16 transmits a switching request signal to the control section 18 (step S14).

As the control section 18 has received the switching request signal in the normal operation mode, the control section 18 transmits a pre-switching event message transmission command signal to the message processing section 21 (step S15). Upon reception of the pre-switching event message transmission command signal from the control section 18, the message processing section 21 transmits a pre-switching event message to the switching target line 203 (step S16). Then, the control section 18 outputs a switching command signal to the switching section 19 (step S17). The switching section 19 performs line switching according to the switching command signal from the control section 18, and changes the transmission direction of the user traffic from the direction of the message processing section 20 to the direction of the message processing section 21 (step S18). Upon completion of the switching, the control section 18 transmits a post-switching event message transmission command signal to the message processing section 20 (step S19). Then, the state of the control section 18 is changed to a post-switching event message reception waiting state. Upon reception of the post-switching event message transmission command signal from the control section 18, the message processing section 20 transmits a post-switching event message to the switching source line 202 (step S20).

Figure 4:
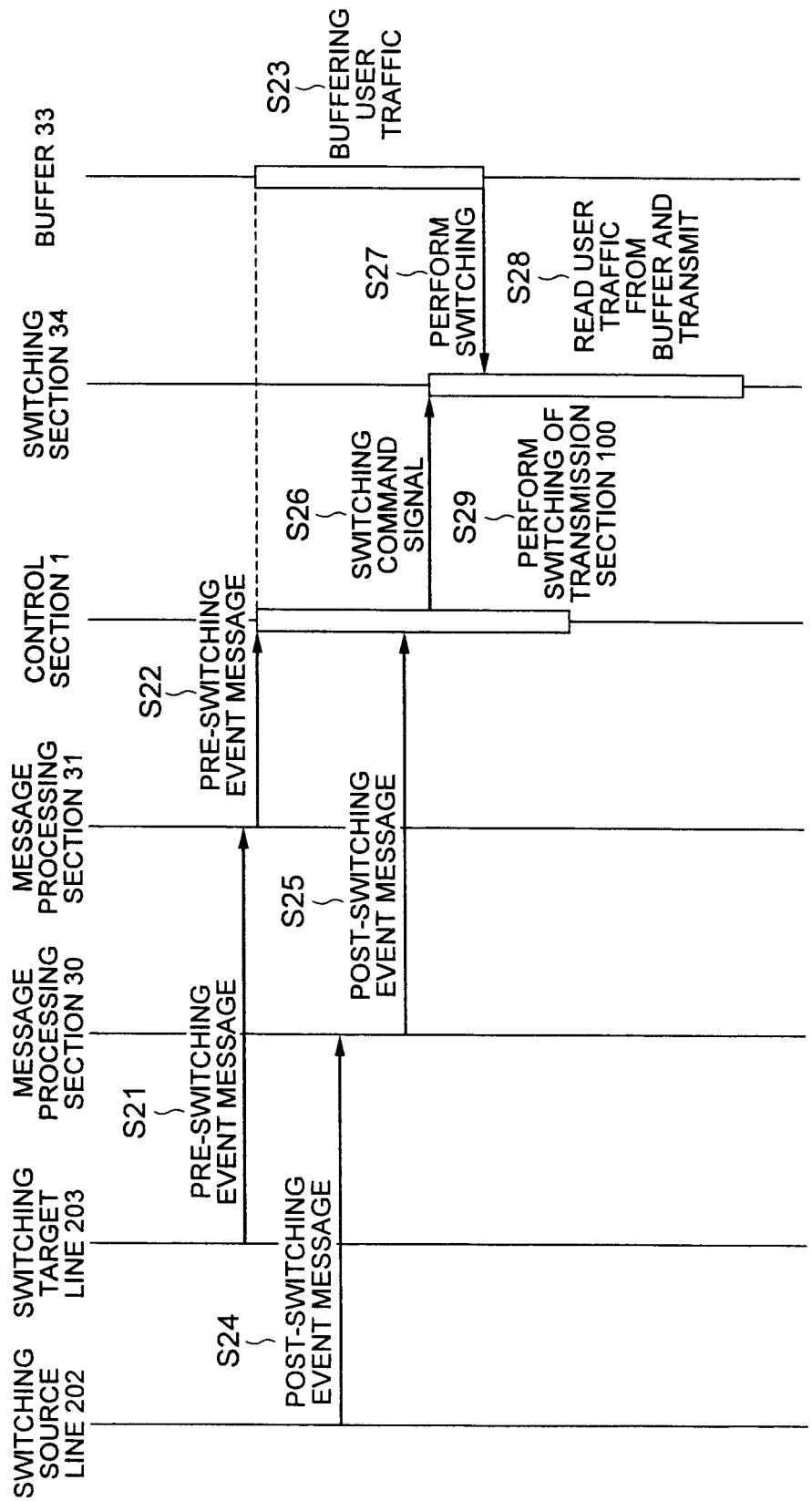
FIG. 4 is a chart showing a reception section switching sequence of another transmission/reception device according to the second exemplary embodiment of the present invention.

Next, the switching operation of the reception section 102 in the transmission/reception device 104 shown in FIG. 1 will be described with reference to the sequence chart of FIG. 4.

In FIG. 1, when the message processing section 31 receives a pre-switching event message from the switching target line 203 (step S21 in FIG. 4), the message processing section 31 transmits the pre-switching event message to the control section 1 (step S22). In accordance with the pre-switching event message from the message processing section 31, the control section 1 instructs the buffer 33 to start buffering of the user traffic 108. The buffer 33 stores the user traffic flowing subsequent to the pre-switching event message from the message processing section 31 (step S23). It should be noted that the buffer 33 may be adapted to constantly buffer the user traffic received by the message processing section 31.

When the message processing section 30 receives a post-switching event message from the switching source line 202 (step S24), the message processing section 30 transmits the post-switching event message to the control section 1 (step S25). When the post-switching event message from the message processing section 30 is provided to the control section 1, as the control section 1 has received the post-switching event message in the normal operation mode, the control section 1 transmits a switching command signal to the switching section 34 in order to perform reception section switching (step S26). Further, upon reception of the post-switching event message from the message processing section 30, the control section 1 performs switching of the transmission section 100 in accordance with the switching sequence shown in FIG. 5 described below (step S29). After this step, the switching execution sequence of the transmission section 100 and the switching execution sequence of the reception section 102 are performed in parallel. It should be noted that upon reception of the pre-switching event message from the message processing section 31, the control section 1 may perform switching of the transmission section 100 in accordance with the switching sequence shown in FIG. 5 described below.

When the switching section 34 receives the switching command signal from the control section 1, the switching section 34 performs line switching to switch the buffer, from which the user traffic is read, from the buffer 32 to the buffer 33 (step S27). Upon completion of the switching, the switching section 34 reads the user traffic stored in the buffer 33, and transmits it to the outside (step S28). The buffer 33 deletes the readout user traffic.

Figure 5:
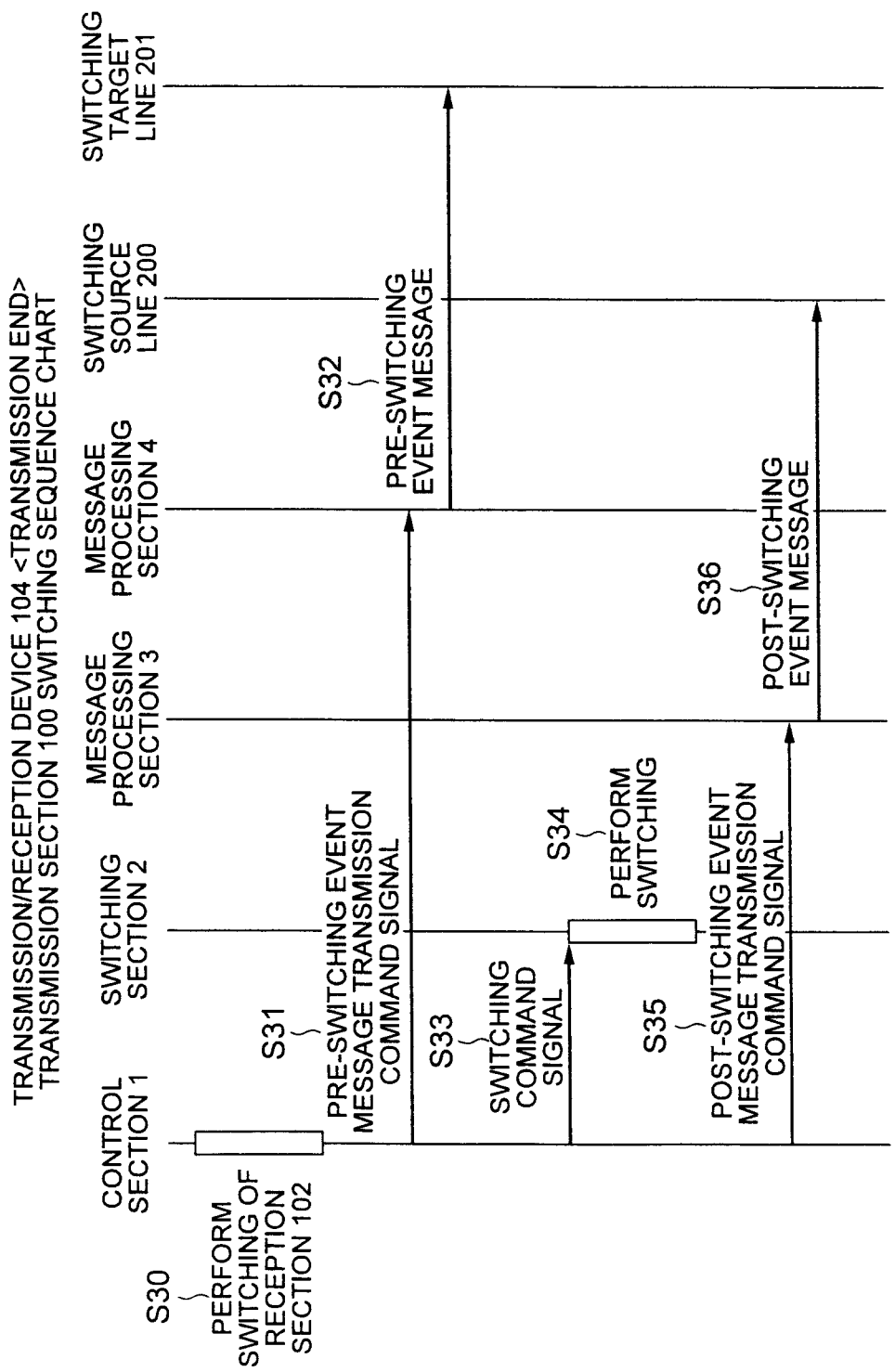
FIG. 5 is a chart showing a transmission section switching sequence of the other transmission/reception device according to the second exemplary embodiment of the present invention.

Next, the switching operation of the transmission section 100 in the transmission/reception device 104 shown in FIG. 1 will be described with reference to the sequence chart of FIG. 5.

In FIG. 1, the control section 1 performs switching of the reception section 102 (step S30), and then transmits a pre-switching event message transmission command signal to the message processing section 4 (step S31). When the message processing section 4 receives the pre-switching event message transmission command signal from the control section 1, the message processing section 4 transmits a pre-switching event message to the switching target line 201 (step S32). Then, the control section 1 transmits a switching command signal to the switching section 2 (step S33). When the switching section 2 receives the switching command signal from the control section 1, the switching section 2 performs line switching to switch the transmission direction of the user traffic from the direction of the message processing section 3 to the direction of the message processing section 4 (step S34). Upon completion of the switching, the control section 1 transmits a post-switching event message transmission command signal to the message processing section 3 (step S35). Then, the control section 1 returns to the normal operation mode. When the message processing section 3 receives the post-switching event message transmission command signal from the control section 1, the message processing section 3 transmits a post-switching event message to the switching source line 200 (step S36).

Figure 6:
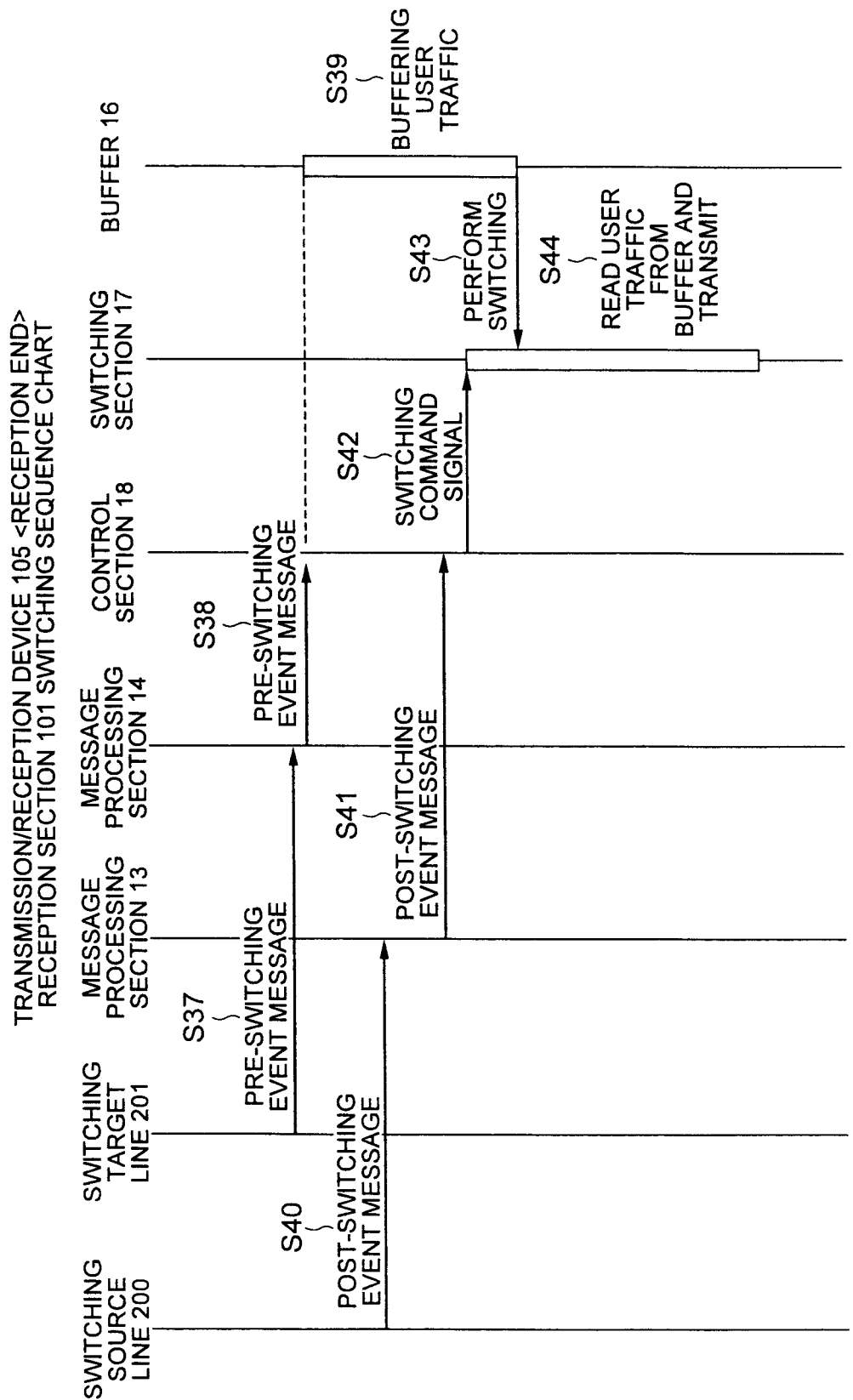
FIG. 6 is a chart showing a reception section switching sequence of the one transmission/reception device according to the second exemplary embodiment of the present invention.

Next, the switching operation of the reception section 101 in the transmission/reception device 105 shown in FIG. 1 will be described with reference to the sequence chart of FIG. 6.

In FIG. 1, when the message processing section 14 receives a pre-switching event message from the switching target line 201 (step S37 in FIG. 6), the message processing section 14 transmits a pre-switching event message to the control section 18 (step S38). The control section 18 instructs the buffer 16 to start buffering of the user traffic in accordance with the pre-switching event message from the message processing section 14. The buffer 16 stores the user traffic, flowing subsequent to the pre-switching event message from the message processing section 14, in the buffer (step S39).

When the message processing section 13 receives a post-switching event message from the switching source line 200 (step S40), the message processing section 13 transmits a post-switching event message to the control section 18 (step S41). When the post-switching event message from the message processing section 13 is provided to the control section 18, as the control section 18 is in the post-switching event message reception waiting state, the control section 18 transmits a switching command signal to the switching section 17 in order to perform reception section switching (step S42). When the switching command signal from the control section 18 is provided to the switching section 17, the switching section 16 performs line switching to switch the buffer, from which the user traffic is read, from the buffer 15 to the buffer 16 (step S43). Upon completion of the switching, the switching section 17 reads the user traffic stored in the buffer 16, and transmits it to the outside (step S44). The buffer 16 deletes the readout user traffic.

Consequently, the transmission/reception device 104 and the transmission/reception device 105 have performed switching of the transmission sections and the reception sections respectively, triggered by the deterioration in the state of the line 200, to thereby perform bidirectional switching from the switching source line 200 and the switching source line 202 to the switching target line 201 and the switching target line 203.

In above description, the case where the state of the line 200 is deteriorated to a level requiring line switching during operation in the initial state has been described. In this case, the state of the transmission/reception device 105 is changed in the sequence of a normal operation mode (state 35), transmission section switching (state 36), post-switching event message reception waiting (state 37), reception section switching (state 38), and a normal operation mode (state 35), in accordance with the state transmission diagram of FIG. 2. Further, the state of the transmission/reception device 104 is changed in the sequence of a normal operation mode (state 35), reception section switching (state 39), transmission section switching (state 40), and a normal operation mode (state 35), in accordance with the state transmission diagram of FIG. 2.

On the other hand, even in the case where the state of the line 202 is deteriorated to a level requiring line switching during operation in the initial state, the transmission/reception device 104 and the transmission/reception device 105 perform switching of the transmission sections and the reception sections respectively, triggered by the deterioration in the state of the line 202, to thereby perform bidirectional switching from the switching source line 200 and the switching source line 202 to the switching target line 201 and the switching target line 203. In that case, however, the transmission/reception device 104 first performs switching of the transmission section 100, then the transmission/reception device 105 performs switching of the reception section 101 and the transmission section 103, and finally the transmission/reception device 104 switches the reception section 102. As such, the state of the transmission/reception device 104 is changed in the sequence of a normal operation mode (state 35), transmission section switching (state 36), post-switching event message reception waiting (state 37), reception section switching (state 38), and a normal operation mode (state 35), in accordance with the state transition diagram of FIG. 2. Further, the state of the transmission/reception device 105 is changed in the sequence of a normal operation mode (state 35), reception section switching (state 39), transmission section switching (state 40), and a normal operation mode (state 35), in accordance with the state transition diagram of FIG. 2.

Similarly, even in the case where the states of the line 200 and the line 202 are deteriorated to a level requiring line switching simultaneously during operation in the initial state, the transmission/reception device 104 and the transmission/reception device 105 perform switching of the transmission sections and the reception sections respectively, triggered by the deterioration in the states of the lines 200 and 202, to thereby perform bidirectional switching from the switching source line 200 and the switching source line 202 to the switching target line 201 and the switching target line 203. In that case, however, the states of the transmission/reception device 104 and the transmission/reception device 105 are changed in the sequence of a normal operation mode (state 35), transmission section switching (state 36), post-switching event message reception waiting (state 37), reception section switching (state 38), and a normal operation mode (state 35), in accordance with the state transition diagram of FIG. 2.

As described above, according to the present embodiment, even if there is a delay difference between the switching source lines 200 and 202 and the switching target lines 201 and 203, it is possible to perform line switching for preventive maintenance based on the status of error correction of the lines, without causing a packet loss or a change in the sequence of packets.

For example, it is assumed that after the transmission section 100 transmits, to the line 200, a packet 1, a packet 2, a packet 3, and a packet 4 of the user traffic in this order, the transmission section 100 switches the line to the line 201 and transmits subsequent packets, namely, a packet 5, a packet 6, a packet 7, and a packet 8, of the user traffic to the line 201 in this order. In this case, the transmission section 100 transmits a pre-switching event message to the line 201 before transmitting the packet 5, and transmits a post-switching event message to the line 200 after transmitting the packet 4. As the line 201 has a higher speed than the line 200, even if the packets 5 and 6 reach the reception section 101 earlier than the packets 3 and 4, the post-switching event message has not reached the reception section 101. As such, the packets 5 and 6 remain stored in the buffer 16. When the packets 3 and 4 reach the reception section 101 after the packets 5 and 6, the packets 3 and 4 are first stored in the buffer 15. Then, when the reception section 101 receives the post-switching event message via the line 200, the reception section 101 performs line switching. Thereby, the packets 3 and 4 stored in the buffer 15 are first read and output to the outside, and then the packets 5 and 6 stored in the buffer 16 are read. As a result, the packets 1, 2, 3, 4, 5, 6, 7, and 8 are output in this order from the switching section 17 to the outside, whereby a packet loss or a change in the sequence of the packets will not be caused.

Third Exemplary Embodiment

While the second exemplary embodiment described above is configured such that the lines in both directions are switched simultaneously triggered by deterioration in the line state of one or both of the switching source lines 200 and 202, in the present embodiment, line switching is performed in a single direction. Specifically, in FIG. 1, after the FEC status determination section 106 of the transmission/reception device 105 receives a switching request signal (step S14 in FIG. 3), the control section 18 transmits a switching notification message transmission command signal to the message processing section 20. In accordance with the switching notification message transmission command signal from the control section 18, the message processing section 20 combines a switching notification message using VSM of the Ethernet OAM with the user traffic, and transmits the result to the transmission/reception device 104 via the switching source line 202. The message processing section 30 separates the traffic into the user traffic and the switching notification message in accordance with the switching notification message from the switching source line 202, and transmits a switching command signal to the control section 1. When the control section 1 receives the switching command signal, the control section 1 performs switching of the transmission section 100 in the same manner as that described in the first exemplary embodiment. Thereby, switching of the reception section 101 is performed subsequently in the same manner as that described in the second exemplary embodiment.

As described above, according to the present embodiment, line switching in a single direction can be performed, which is triggered by deterioration in the line state of one of the switching source lines 200 and 202.

Fourth Exemplary Embodiment

Figure 7:
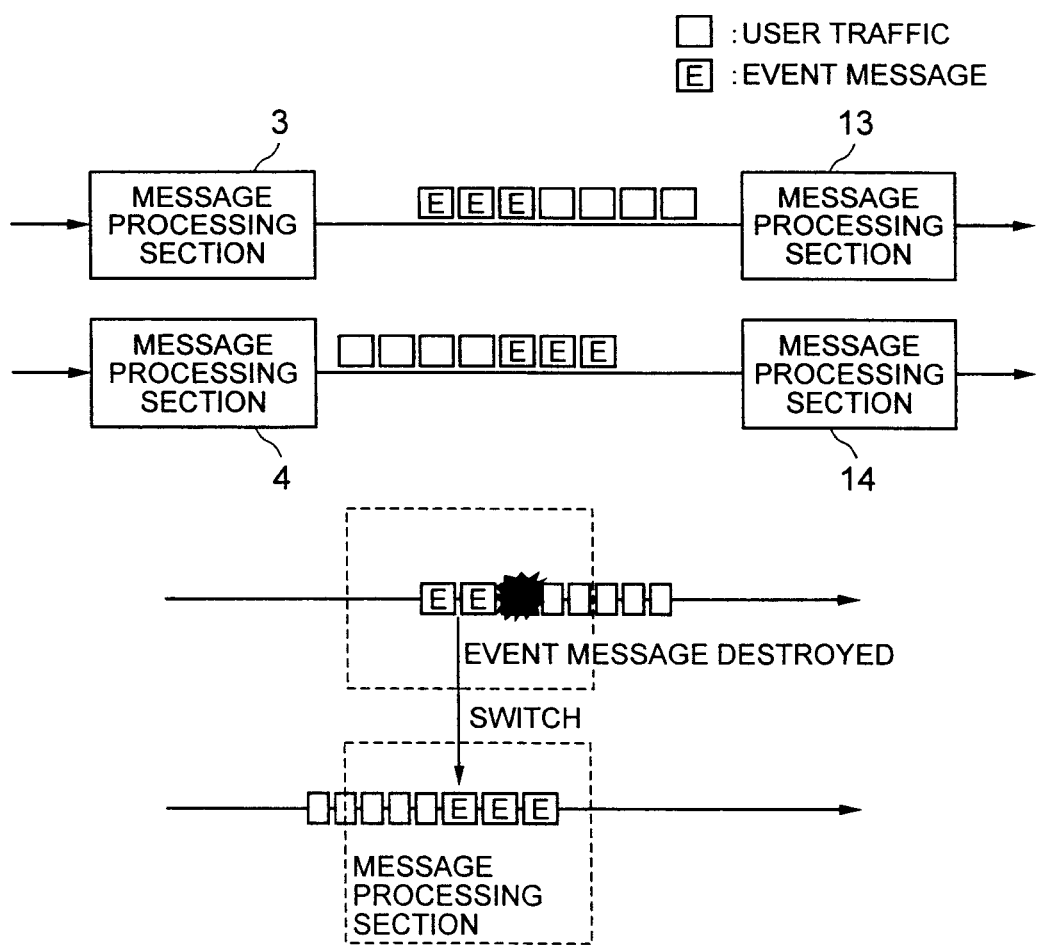
FIG. 7 is a block diagram showing the main part of another exemplary embodiment of the present invention.

In a fourth exemplary embodiment of the present invention, while the basic configuration thereof is the same as that of the first to third exemplary embodiments, another effort is made to an event message. FIG. 7 shows the configuration of the fourth exemplary embodiment. In FIG. 7, the message processing section makes copies of a post-switching event message when transmitting the post-switching event message, and transmits a plurality of copies of the post-switching event message continuously.

In this way, as the post-switching event message is transmitted multiple times in the present embodiment, even if any copy of the post-switching event message is destroyed for some reasons, the present embodiment can achieve an advantageous effect that the line switching processing can be operated normally as long as at least one copy of the post-switching event message is normal.

While description has been given on the post-switching event message in the above, it is also possible to transmit a plurality of copies of a pre-switching event message continuously in a similar manner.

Other Exemplary Embodiments

In the above exemplary embodiments, while switching is performed by limiting to user traffic, it is possible to separate the user traffic on a VLAN basis, and perform line switching by a unit of VLAN traffic. By performing line switching by a unit of VLAN traffic, it is possible to perform switching in preference to traffic having higher priority.

While description has been given on the exemplary embodiments in which the present invention is applied to 1:1 protection, the present invention is also applicable to a communication device implementing both 1:1 protection and 1+1 protection. In that case, by using a pre-switching message as an instruction to start buffering of a switching target line in the 1+1 protection, it is possible to prevent generation of frame overlap when switching a line in the 1+1 protection.

The present application is based upon and claims the benefit of priority from Japanese patent application No. 2010-090257, filed on Apr. 9, 2010, the disclosure of which is incorporated herein in its entirety by reference.

Industrial Applicability

The present invention is applicable to line switching for preventive maintenance, and in particular, applicable to switching between lines having some delay differences.

REFERENCE NUMERALS 1 control section
2 switching section
3 message processing section
4 message processing section
5 FEC encapsulating section
6 FEC encapsulating section
7 error detection section
8 error detection section
9 error correction section
10 error correction section
11 FEC decapsulating section
12 FEC decapsulating section
13 message processing section
14 message processing section
15 buffer
16 buffer
17 switching section
18 control section
19 switching section
20 message processing section
21 message processing section
22 FEC encapsulating section
23 FEC encapsulating section
24 error detection section
25 error detection section
26 error correction section
27 error correction section
28 FEC decapsulating section
29 FEC decapsulating section
30 message processing section
31 message processing section
32 buffer
33 buffer
34 switching section

The invention claimed is:

1. A transmission system comprising a first communication device and a second communication device, the first communication device and the second communication device being connected with each other via a first line to be used for transmitting frames of traffic from the first communication device to the second communication device while performing error-correction coding on the frames, a second line to be used when the first line is in failure, and a third line to be used for transmission from the second communication device to the first communication device, wherein the second communication device includes a first buffer which stores the frames received from the first line, and a second buffer which stores the frames received from the second line, when the second communication device determines that it is necessary to perform line switching from the first line to the second line based on a status of error correction with respect to the frames received from the first line, the second communication device transmits a predetermined message to the first communication device via the third line, when the first communication device receives the predetermined message via the third line, the first communication device transmits a frame of a post-switching message to the first line after switching the line used for transmission from the first line to the second line, and when the second communication device receives the post-switching message from the first line, the second communication device starts reading of the frames from the second buffer after reading all of the frames stored in the first buffer.

2. The transmission system according to claim 1, wherein the third line is a line to be used for transmitting frames of traffic from the second communication device to the first communication device while performing error-correction coding on the frames, the first communication device and the second communication device are further connected via a fourth line to be used when the third line is in failure, the first communication device includes a third buffer which stores the frames received from the third line, and a fourth buffer which stores the frames received from the fourth line, the second communication device is adapted to when determining that it is necessary to perform line switching from the first line to the second line based on a status of error correction with respect to the frames received from the first line in a normal operation state, after switching the line used for transmission from the third line to the fourth line, transmit a frame of the post-switching message, as the predetermined message, to the third line and allow the state of the second communication device to be changed to a post-switching event message reception waiting state, and when receiving the post-switching message from the first line in the post-switching event message reception waiting state, perform reception section switching in which the second communication device starts reading of the frames from the second buffer after reading all of the frames stored in the first buffer, and then allow the state of the second communication device to be changed to the normal operation state, and when receiving the post-switching message from the first line in the normal operation state, perform reception section switching in which the second communication device starts reading of the frames from the second buffer after reading all of the frames stored in the first buffer, and after switching the line used for transmission from the third line to the fourth line, transmit a frame of the post-switching message to the third line and allow the state of the second communication device to be changed to the normal operation state, and the first communication device is adapted to when determining that it is necessary to perform line switching from the third line to the fourth line based on a status of error correction with respect to the frames received from the third line in a normal operation state, after switching the line used for transmission from the first line to the second line, transmit a frame of the post-switching message to the first line and allow the state of the first communication device to be changed to a post-switching event message reception waiting state, and when receiving the post-switching message from the third line in the post-switching event message reception waiting state, perform reception section switching in which the first communication device starts reading of the frames from the fourth buffer after reading all of the frames stored in the third buffer, and then allow the state of the first communication device to be changed to the normal operation state, and when receiving the post-switching message from the third line in the normal operation state, perform reception section switching in which the first communication device starts reading of the frames from the fourth buffer after reading all of the frames stored in the third buffer, and after switching the line used for transmission from the first line to the second line, transmit a frame of the post-switching message to the first line and allow the state of the first communication device to be changed to the normal operation state.

3. The transmission system according to claim 2, wherein the first communication device includes a first transmission section connected with the first line and the second line, a first reception section connected with the third line and the fourth line, and a first control section, the first transmission section includes a first switching section, a first message processing section, a first FEC frame generation section connected with the first line, a second message processing section, and a second FEC frame generation section connected with the second line, when the first control section receives the frame of the post-switching message from the third line, the first control section outputs a pre-switching message transmission command signal to the second message processing section and outputs a switching command signal to the first switching section, and then outputs a post-switching message transmission command signal to the first message processing section upon completion of switching by the first switching section, the first switching section outputs the frames of the traffic to the first message processing section in an initial state, and when receiving the switching command signal, outputs the frames of the traffic to the second message processing section, the second message processing section transmits a frame of a pre-switching message to the second FEC frame generation section based on the pre-switching message transmission command, and then outputs the frames of the traffic, input from the first switching section, to the second FEC frame generation section, the second FEC frame generation section encapsulates a plurality of the input frames into an FEC frame and outputs the FEC frame to the second line, the first message processing section outputs the frames of the traffic, input from the first switching section, to the first FEC frame generation section, and outputs the frame of the post-switching message to the first FEC frame generation section based on the post-switching message transmission command signal, and the first FEC frame generation section encapsulates a plurality of the input frames into an FEC frame, and outputs the FEC frame to the first line.

4. The transmission system according to claim 2, wherein the second communication device includes a second reception section connected with the first line and the second line, a second transmission section connected with the third line and the fourth line, and a second control section, the second reception section includes a first frame reproduction section connected with the first line, a third message processing section, the first buffer, a second frame reproduction section connected with the second line, a fourth message processing section, the second buffer, a first FEC status determination section, and a second switching section, the first frame reproduction section performs error-correction processing on an FEC frame received from the first line to reproduce the encapsulated frame and outputs the frame to the third message processing section, and notifies the first FEC status determination section of error correction information, the second frame reproduction section performs error-correction processing on an FEC frame received from the second line to reproduce the encapsulated frame and outputs the frame to the fourth message processing section, and notifies the first FEC status determination section of error correction information, the third message processing section outputs an input frame to the first buffer if the input frame is a frame of the traffic, while outputting the input frame to the second control section if the input frame is a frame of the post-switching message, the fourth message processing section outputs an input frame to the second buffer if the input frame is a frame of the traffic, while outputting the input frame to the second control section if the input frame is a frame of the pre-switching message, the first FEC status determination section determines necessity of line switching from the first line to the second line based on the notified error-correction information, and outputs a switching request signal to the second control section, and the second control section notifies the second buffer to start buffering of the traffic when the pre-switching message is input, outputs a switching command signal to the second switching section when the post-switching message is input, and transmits, by the second transmission section, the post-switching message to the third line when the switching request signal is input.

5. The transmission system according to claim 1, wherein in the transmission of the frame of the post-switching message, a plurality of frames of the post-switching messages are continuously transmitted.

6. A transmission method implemented by a transmission system including a first communication device and a second communication device, the first communication device and the second communication device being connected with each other via a first line to be used for transmitting frames of traffic from the first communication device to the second communication device while performing error-correction coding on the frames, a second line to be used when the first line is in failure, and a third line to be used for transmission from the second communication device to the first communication device, the second communication device including a first buffer which stores the frames received from the first line, and a second buffer which stores the frames received from the second line, the method comprising:

by the second communication device, when determines that it is necessary to perform line switching from the first line to the second line based on a status of error correction with respect to the frames received from the first line, transmitting a predetermined message to the first communication device via the third line, by the first communication device, when receiving the predetermined message via the third line, transmitting a frame of a post-switching message to the first line after switching the line used for transmission from the first line to the second line, and by the second communication device, when receiving the post-switching message from the first line, starting reading of the frames from the second buffer after reading all of the frames stored in the first buffer.

7. The transmission method according to claim 6, wherein
the third line is a line to be used for transmitting frames of traffic from the second communication device to the first communication device while performing error-correction coding on the frames,
the first communication device and the second communication device are further connected via a fourth line to be used when the third line is in failure,
the first communication device includes a third buffer which stores the frames received from the third line, and a fourth buffer which stores the frames received from the fourth line, and
the method further comprises:
by the second communication device,
when determining that it is necessary to perform line switching from the first line to the second line based on a status of error correction with respect to the frames received from the first line in a normal operation state, after switching the line used for transmission from the third line to the fourth line, transmitting a frame of the post-switching message, as the predetermined message, to the third line and allowing the state of the second communication device to be changed to a post-switching event message reception waiting state, and when receiving the post-switching message from the first line in the post-switching event message reception waiting state, performing reception section switching in which the second communication device starts reading of the frames from the second buffer after reading all of the frames stored in the first buffer, and then allowing the state of the second communication device to be changed to the normal operation state, and when receiving the post-switching message from the first line in the normal operation state, performing reception section switching in which the second communication device starts reading of the frames from the second buffer after reading all of the frames stored in the first buffer, and after switching the line used for transmission from the third line to the fourth line, transmitting a frame of a post-switching message to the third line and allowing the state of the second communication device to be changed to the normal operation state, and by the first communication device,
when determining that it is necessary to perform line switching from the third line to the fourth line based on a status of error correction with respect to the frames received from the third line in a normal operation state, after switching the line used for transmission from the first line to the second line, transmitting a frame of the post-switching message to the first line and allowing the state of the first communication device to be changed to a post-switching event message reception waiting state, and when receiving the post-switching message from the third line in the post-switching event message reception waiting state, performing reception section switching in which the first communication device starts reading of the frames from the fourth buffer after reading all of the frames stored in the third buffer, and then allowing the state of the first communication device to be changed to the normal operation state, and when receiving the post-switching message from the third line in the normal operation state, performing reception section switching in which the first communication device starts reading of the frames from the fourth buffer after reading all of the frames stored in the third buffer, and after switching the line used for transmission from the first line to the second line, transmitting a frame of the post-switching message to the first line and allowing the state of the first communication device to be changed to the normal operation state.

8. The transmission method according to claim 6, wherein
in the transmitting the frame of the post-switching message, a plurality of frames of the post-switching messages are continuously transmitted.

9. A communication device connected with another communication device via a first line to be used for transmitting frames of traffic while performing error-correction coding on the frames, a second line to be used when the first line is in failure, a third line to be used for transmitting frames of traffic while performing error-correction coding on the frames, and a fourth line to be used when the third line is in failure, wherein
the communication device includes a first buffer which stores the frames received from the first line, and a second buffer which stores the frames received from the second line, and
the communication device is adapted to
when determining that it is necessary to perform line switching from the first line to the second line based on a status of error correction with respect to the frames received from the first line in a normal operation state, after switching the line used for transmission from the third line to the fourth line, transmit a frame of a post-switching message to the third line and allow the state of the communication device to be changed to a post-switching event message reception waiting state, and when receiving the post-switching message from the first line in the post-switching event message reception waiting state, perform reception section switching in which the communication device starts reading of the frames from the second buffer after reading all of the frames stored in the first buffer, and then allow the state of the communication device to be changed to the normal operation state, and when receiving the post-switching message from the first line in the normal operation state, perform reception section switching in which the communication device starts reading of the frames from the second buffer after reading all of the frames stored in the first buffer, and after switching the line used for transmission from the third line to the fourth line, transmit a frame of the post-switching message to the third line and allow the state of the communication device to be changed to the normal operation state.

10. The communication device according to claim 9, wherein in the transmission of the frame of the post-switching message, a plurality of frames of the post-switching messages are continuously transmitted.

\* \* \* \* \*